US011055891B1

(12) United States Patent
Ofek et al.

(10) Patent No.: US 11,055,891 B1
(45) Date of Patent: Jul. 6, 2021

(54) REAL TIME STYLING OF MOTION FOR VIRTUAL ENVIRONMENTS

(71) Applicant: Microsoft Technology Licensing, LLC, Redmond, WA (US)

(72) Inventors: Eyal Ofek, Redmond, WA (US); Mar Gonzalez Franco, Seattle, WA (US); Andrew D. Wilson, Seattle, WA (US); Karan Ahuja, Pittsburgh, PA (US); Christian Holz, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/814,130

(22) Filed: Mar. 10, 2020

(51) Int. Cl.
*G06T 13/40* (2011.01)
*G06T 13/80* (2011.01)
*G06F 3/01* (2006.01)

(52) U.S. Cl.
CPC ............. *G06T 13/40* (2013.01); *G06F 3/012* (2013.01); *G06T 13/80* (2013.01)

(58) Field of Classification Search
CPC .......... G06T 13/40; G06T 13/80; G06F 3/012
See application file for complete search history.

(56) References Cited

U.S. PATENT DOCUMENTS

| 8,761,437 | B2 | 6/2014 | Kirovski et al. |
| 9,789,392 | B1 | 10/2017 | Lotzer |
| 10,058,773 | B2 | 8/2018 | Huang |
| 2011/0009241 | A1 | 1/2011 | Lane et al. |
| 2013/0063477 | A1* | 3/2013 | Richardson ............. G06F 3/012 345/619 |
| 2018/0224930 | A1 | 8/2018 | Folmer et al. |

OTHER PUBLICATIONS

"CMU Graphics Lab Motion Capture Database", Retrieved from: https://web.archive.org/web/20190922102141/http:/mocap.cs.cmu.edu/, Sep. 22, 2019, 3 Pages.
"Final IK", Retrieved from: https://assetstore.unity.com/packages/tools/animation/final-ik-14290, Retrieved Date: Oct. 1, 2019, 6 Pages.
Aneja, et al., "Modeling stylized character expressions via deep learning", In Proceedings of 13th Asian Conference on Computer Vision, Nov. 20, 2016, pp. 1-18.
(Continued)

*Primary Examiner* — Chong Wu

(57) ABSTRACT

Examples of the present disclosure describe systems and methods for providing real-time motion styling in virtual reality (VR), augmented reality (AR), and/or mixed reality (MR) environments. In aspects, input data corresponding to user interaction with a VR, an AR, or an MR environment may be received. The input data may be featurized to generate a feature set. The feature set may be compared to a set of stored motion data comprising motion capture data representing one or more motion styles for executing an action or activity. Based on the comparison, the feature set may be matched to feature data for one or more motions styles in the stored motion data. The one or more motions styles may then be executed by a virtual avatar or a virtual object in the VR/AR/MR environment.

20 Claims, 8 Drawing Sheets

(56) References Cited

OTHER PUBLICATIONS

Aristidou, et al., "FABRIK: A fast, iterative solver for the Inverse Kinematics problem", In Journal of Graphical Models, vol. 73, Issue 5, Sep. 1, 2011, pp. 243-260.

Azmandian, et al., "Haptic retargeting: Dynamic repurposing of passive haptics for enhanced virtual reality experiences", In Proceedings of the chi conference on human factors in computing systems, May 7, 2016, pp. 1968-1979.

Blanke, et al., "Full-body illusions and minimal phenomenal selfhood", In Journal of Trends in cognitive sciences, vol. 13, Issue 1, Jan. 1, 2009, pp. 7-13.

Botvinick, et al., "Rubber hands 'feel' touch that eyes see", In Journal of Nature, vol. 391, Issue 6669, Feb. 19, 1998, 7 Pages.

Brunner, Jerry, "Mixed models for the analysis of repeated measurements", Retrieved from: http://www.utstat.toronto.edu/~brunner/workshops/mixed/, Retrieved Date: Oct. 1, 2019, 1 Page.

Caserman, et al., "Real-time step detection using the integrated sensors of a head-mounted display", In IEEE international conference on systems, man, and cybernetics, Oct. 9, 2016, 6 Pages.

Casiez, et al., "No more bricolage!: methods and tools to characterize, replicate and compare pointing transfer functions", In Proceedings of the 24th annual ACM symposium on User interface software and technology, Oct. 16, 2011, 12 Pages.

Cheng, et al., "Sparse haptic proxy: Touch feedback in virtual environments using a general passive prop", In Proceedings of the CHI Conference on Human Factors in Computing Systems, May 6, 2017, 11 Pages.

Desai, et al., "Geppetto: Enabling Semantic Design of Expressive Robot Behaviors", In Proceedings of the CHI Conference on Human Factors in Computing Systems, Apr. 18, 2019, pp. 1-12.

Feuchtner, et al., "Ownershift: Facilitating Overhead Interaction in Virtual Reality with an Ownership-Preserving Hand Space Shift", In Proceedings of 31st Annual ACM Symposium on User Interface Software and Technology, Oct. 14, 2018, pp. 31-43.

Gallagher, Shaun, "Philosophical conceptions of the self: implications for cognitive science", In Journal of Trends in cognitive sciences and Technology, vol. 4, Issue 1, Jan. 1, 2000, pp. 14-21.

Gerling, et al., "Full-body motion-based game interaction for older adults", In Proceedings of the SIGCHI Conference on Human Factors in Computing Systems, May 5, 2012, pp. 1873-1882.

Gonzalez-Franco, et al., "Avatar Embodiment. Towards a Standardized Questionnaire", In Journal of Frontiers in Robotics and AI, vol. 5, Issue 74, Jun. 22, 2018, pp. 1-9.

Holden, et al., "Fast neural style transfer for motion data", In Journal of IEEE computer graphics and applications, vol. 37, Issue 4, Aug. 21, 2017, pp. 1-10.

Jiang, et al., "Real-time full-body motion reconstruction and recognition for off-the-shelf VR devices", In Proceedings of the 15th ACM SIGGRAPH Conference on Virtual-Reality Continuum and Its Applications in Industry—vol. 1, Dec. 3, 2016, pp. 309-318.

Jolliffe, Ian T, "Principal Component Analysis and Factor Analysis", In Principal Component Analysis, Jun. 1986.

Kapadia, et al., "Efficient Motion Retrieval in Large Motion Databases", In Proceedings of the ACM SIGGRAPH Symposium on Interactive 3D Graphics and Games, May 21, 2013, 11 Pages.

Kilteni, et al., "The sense of embodiment in virtual reality", In Journal of Presence: Teleoperators and Virtual Environments, vol. 21, Issue 4, Nov. 2012, pp. 373-387.

Kokkinara, et al., "Measuring the effects through time of the influence of visuomotor and visuotactile synchronous stimulation on a virtual body ownership illusion", In Journal of Perception, vol. 43, Issue 1, Jan. 2014, pp. 43-58.

Kovar, et al., "Motion graphs", In Proceedings of ACM SIGGRAPH classes, Aug. 11, 2018, pp. 473-482.

Lin, et al., "Temporal IK: Data-Driven Pose Estimation for Virtual Realiity", In Technical Report No. UCB/EECS-2019-59, May 17, 2019, 33 Pages.

Liu, et al., "Realtime Human Motion Control with A Small Number of Inertial Sensors", In Proceedings of Symposium on Interactive 3D Graphics and Games, Feb. 18, 2011, pp. 133-140.

Maselli, et al., "The building blocks of the full body ownership illusion", In Journal of Frontiers in human neuroscience, vol. 7, Mar. 21, 2013, pp. 1-15.

Min, et al., "Motion graphs++: a compact generative model for semantic motion analysis and synthesis", In Journal of ACM Transactions on Graphics, vol. 31, Issue 6, Nov. 1, 2012, 12 Pages.

Mueller, et al., "Designing for Bodily Interplay in Social Exertion Games", In Journal of ACM Transactions on Computer-Human Interaction, May 2017, pp. 1-41.

Murillo, et al., "Erg-O: ergonomic optimization of immersive virtual environments", In Proceedings of the 30th Annual ACM Symposium on User Interface Software and Technology, Oct. 20, 2017, 13 Pages.

Padrao, et al., "Violating body movement semantics: Neural signatures of self-generated and external-generated errors", In Journal of Neuroimage, vol. 124, Jan. 1, 2016, pp. 1-10.

Parger, et al., "Human upper-body inverse kinematics for increased embodiment in consumer-grade virtual reality", In Proceedings of the 24th ACM Symposium on Virtual Reality Software and Technology, Nov. 28, 2018, 10 Pages.

Poupyrev, et al., "The go-go interaction technique: non-linear mapping for direct manipulation in VR", In ACM Symposium on User Interface Software and Technology, Nov. 6, 1996, 2 Pages.

Rose, et al., "Verbs and adverbs: Multidimensional motion interpolation", In Journal of IEEE Computer Graphics and Applications, vol. 18, Issue 5, Sep. 18, 1998, pp. 32-40.

Roth, et al., "A simplified inverse kinematic approach for embodied vr applications", In IEEE Virtual Reality, Mar. 19, 2016, 2 Pages.

Slyper, et al., "Mirror puppeteering: Animating toy robots in front of a webcam", In Proceedings of the Ninth International Conference on Tangible, Embedded, and Embodied Interaction, Jan. 16, 2015, 8 Pages.

Spanlang, et al., "How to build an embodiment lab: achieving body representation illusions in virtual reality", In Journal of Frontiers in Robotics and AI, vol. 1, Nov. 27, 2014, pp. 1-22.

Tan, et al., "Virtual Reality Based Immersive Telepresence System for Remote Conversation and Collaboration", In International Workshop on Next Generation Computer Animation Techniques, Jun. 23, 2017.

Tsakiris, et al., "The rubber hand illusion revisited: visuotactile integration and self-attribution", In Journal of Experimental Psychology: Human Perception and Performance, vol. 31, Issue 1, Feb. 2005, pp. 80-91.

Wang, et al., "The cartoon animation filter", In ACM Transactions on Graphics, vol. 25, Issue 3, Jul. 30, 2006, pp. 1169-1173.

Wilson, et al., "Object Manipulation in Virtual Reality Under Increasing Levels of Translational Gain", In Proceedings of the CHI Conference on Human Factors in Computing Systems, Apr. 21, 2018, pp. 1-13.

Wouda, et al., "Estimation of Full-Body Poses Using Only Five Inertial Sensors: An Eager or Lazy Learning Approach?", In Journal of Sensors, vol. 16, Issue 12, Dec. 2016, pp. 1-17.

Xia, et al., "Realtime style transfer for unlabeled heterogeneous human motion", In Journal of ACM Transactions on Graphics, vol. 34, Issue 4, Jul. 27, 2015, 10 Pages.

Yee, et al., "The Proteus effect: The effect of transformed selfrepresentation on behavior", In Journal of Human communication research, vol. 33, Issue 3, Jul. 1, 2007, pp. 271-290.

Yumer, et al., "Spectral style transfer for human motion between independent actions", In Journal of ACM Transactions on Graphics, vol. 35, Issue 4, Jul. 11, 2016, 8 Pages.

* cited by examiner

REAL TIME STYLING OF MOTION FOR VIRTUAL ENVIRONMENTS

BACKGROUND

Virtual reality (VR) systems provide a simulated environment in which users may interact with virtual content. VR systems use motion data corresponding to a user's real-world motion to manipulate an avatar of the user in the simulated environment. Often, the actions and motions of the avatar are limited by the personal capabilities of the user and/or the physical limitations of the user's real-world environment. As a result, many users experience an appreciably degraded experience when using such VR systems.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for providing real-time motion styling in virtual reality (VR), augmented reality (AR), and/or mixed reality (MR) environments. In aspects, input data corresponding to user interaction with a VR, an AR, or an MR environment may be received. The input data may be featurized to generate a feature set. The feature set may be compared to a set of stored motion data comprising motion capture data representing one or more motion styles for executing an action or activity. Based on the comparison, the feature set may be matched to feature data for one or more motion styles in the stored motion data. The one or more motion styles may then be executed by a virtual avatar or a virtual object in the VR/AR/MR environment. For example, a motion style may be applied to a virtual avatar that accurately represents the location, shape, and size of a user's body and/or limbs. The virtual avatar may execute the motion style in real-time such that the motion style closely matches the user interaction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
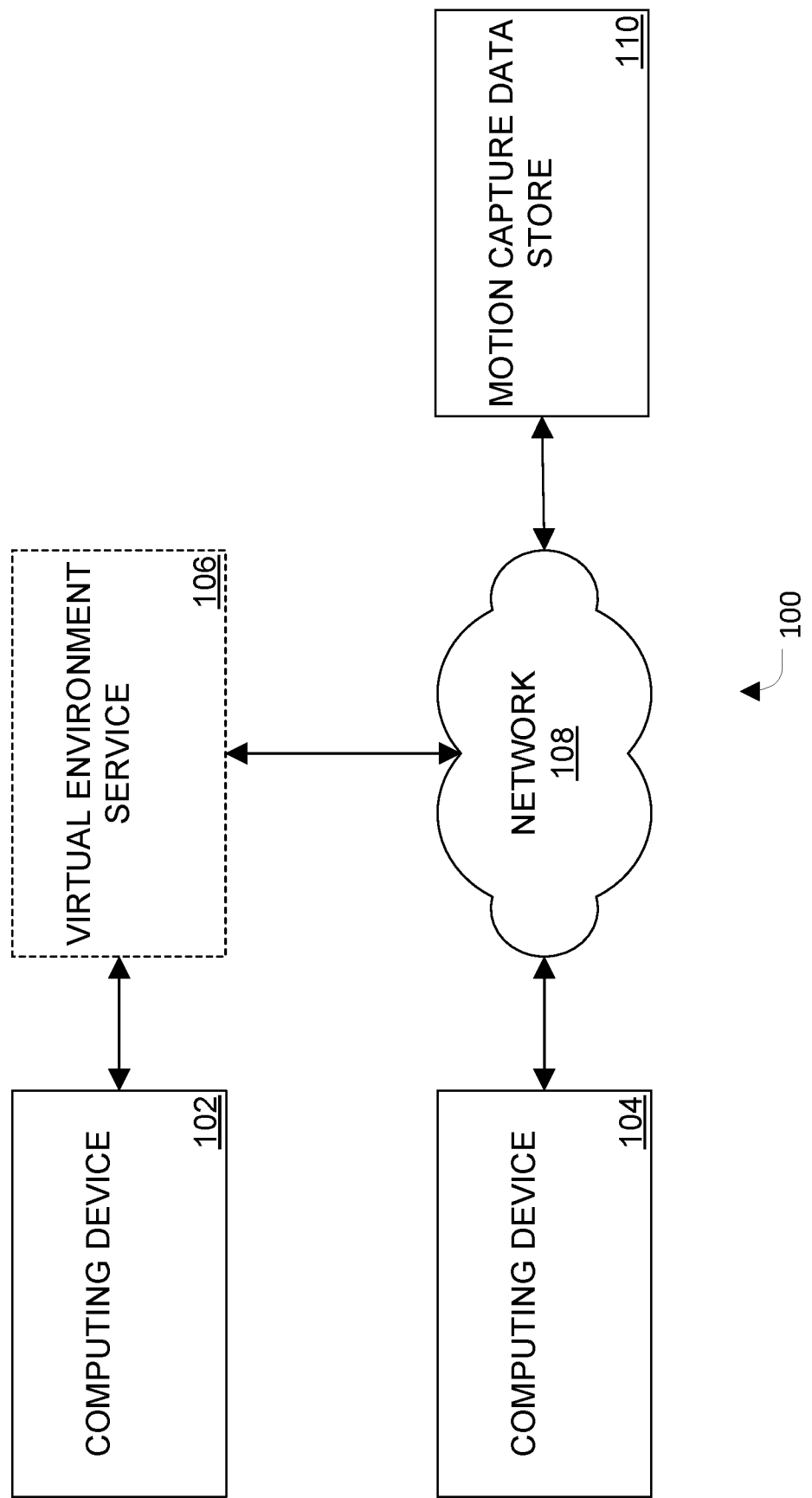
FIG. 1 illustrates an overview of an example system for providing real-time motion styling in VR, AR, and/or MR environments as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

VR enables users to transport themselves to virtual environments by simply putting on a VR headset and picking up VR controllers. As a user moves their head and hands during a VR session, motions captured by the VR tracking system (e.g., via sensors in the headset, controllers, and other components of the VR system/application) are applied to the visual renderings presented to the user. Many VR systems display virtual avatars that are graphical representations of the user. In such systems, the motions detected by the headset and controllers are mapped to the corresponding portions of the avatar. The mapping process typically involves the direct coupling of a user's motion to those of the avatar, which enables the user to maintain full agency of the avatar. Direct coupling, as used herein, refers to a one-to-one coupling of the user's physical movements to those of the user's avatar. Direct coupling, thus, enables natural interaction by the user, as hand-eye coordination and proprioception are accurately represented by the visual avatar. In many VR systems that employ direct coupling, many parts of the user's body may not be tracked due to lack of sensors, occlusion, or noise. As a result, the pose for the untracked body parts are interpolated by the VR system using, for example, inverse kinematics, animations that fit the application context, or pre-captured data.

Despite the simplicity of direct coupling, many VR systems may be limited by the use of direct coupling. For example, in some scenarios, such as in action games, the physical abilities of the user in the physical (e.g., real) world may be limited due to the spatial constraints of the user's physical environment, the physical limitations of the user, or some combination thereof. Such physical limitations may adversely impact the user's virtual avatar, which may be represented by an athlete, a warrior, a dancer, etc. For instance, while engaged in a tennis application of a VR system, a user may not have sufficient space in the user's physical environment to simulate one or more actions (e.g., a serve, a full backhand swing, movements associated with court coverage, etc.). Alternately, the user may be unable to perform the actions due to a physical impairment or lack of physical training. In either case, as a result, the user's avatar may not perform optimally (or even adequately) in the tennis application. Such suboptimal performance may severely degrade the user experience and preclude the user from expressing the desired virtual motions.

Moreover, many VR systems that employ direct coupling provide sensors may not track one or more portions of a user's body, due to lack of sensors, occlusion, or noise. For instance, a VR system that tracks only user head and hand position (via a headset and hand controllers) may map the head and hand positions to the user's avatar. However, many other body positions for the avatar (e.g., leg positions, foot position, etc.) may be unknown. As a result, the pose for the untracked body parts are often interpolated by the VR system using, for example, inverse kinematics, animations that fit the application context, or pre-captured data. Such techniques, however, may limit the user's sense of control, embodiment, and/or agency over the user's avatar.

To address such challenges in VR systems, the present disclosure describes systems and methods for providing real-time motion styling in VR, AR, and/or MR environments. In aspects, a virtual reality (VR), augmented reality (AR), or mixed reality (MR) system may be accessible to a user. The system may comprise a head-mounted display (HMD), zero or more controller devices, and/or zero or more additional sensor components or remote sensing of the user pose from RGB cameras, depth cameras, or any other sensing such as acoustic or magnetic sensing. The HMD may be used to present an environment comprising two-dimensional (2D) and/or three-dimensional (3D) content to the user. The controller(s) or user gestures and speech may be used to manipulate content in the environment. The content may include, for example, 2D and 3D objects, such as an avatar, video objects, image objects, control objects, audio objects, haptic rendering devices, and the like.

In aspects, input data (e.g., motion data, audio data, speech, text data, etc.) corresponding to user interaction with the system may be received by one or more sensors of the system (either wearable, or remote sensing). The input data may be organized into one or more segments or data frames. For each segment/data frame, a set of feature data may be generated. A set of feature data may comprise, for example, object type information, velocity data, acceleration data, position data, sound data (such as voice data, footsteps, or other motion noise data), pressure data, and/or torque data. In at least some examples, the set of feature data may be transformed to, or defined relative to, a particular coordinate system/space. The set(s) of feature data may be used to scale the output motion to be applied to the user's avatar. Scaling, as used herein, refers to the interpolation of motion from input data. Examples scaling techniques include one-to-one mapping (e.g., user motion is directly reflected by the user's avatar), position-based scaling, trajectory-based scaling, or some combination thereof. In examples, scaling enables users to observe fully expressed avatar motions while performing motions with smaller footprints in the physical environment. Scaling, thus, enable a user to perform larger or more extensive motions within a space-constrained environment, or perform more rigorous or extended motions without becoming fatigued.

In aspects, the feature data may also be compared to a set of motion capture data. The motion capture data may comprise motion data corresponding to various actions, activities, and or movements performed by one or more subjects. Alternately (or additionally), the motion data may be synthetically generated using, for example, an animator or physical simulation. In examples, each subject (or grouping of subjects) may exhibit a different or specific motion for performing an action, activity, or movement. The specific motion performed by each subject (or grouping of subjects) may represent a "style" of the subject(s). In some aspects, feature data associated with the motion data may be stored with the motion data. The feature data may be normalized to one or more body parts or coordinate systems. For instance, the feature data may represent head-relative motions. Alternately, the feature data may be associated with a depth video, sound motion data, user brain waves (or other biological signals), or the like.

In aspects, the feature data for the input data may be compared to feature information for the motion capture data. Based on the comparison, zero, one, or more candidate motions in the motion capture data may be identified. For each candidate motion, a match score representing an amount of similarity between the candidate motion and the input data may be calculated. Based on the match scores, a motion corresponding to the user interaction is synthesized. The synthesized motion is a blend of several matching motions weighted by the relative distance between feature vectors of the matching motions, and one-to-one mapping data of the user. In some examples, the one-to-one data may also be weighted. The synthesized motion may be used to animate portions of the user's avatar that correspond to movements detected by the sensors of the system. In some aspects, the synthesized motion may further be used to interpolate full body motions. For example, although input data may only correspond to head and hand movements of the user, one or more synthesized motions may be generated for portions of the user for which movements have not been detected by the sensors of the system. Synthesizing the motion data for the untracked portions of the user may include generating separate mappings for various body parts, and fusing the separate mappings (per limb) to create a full body motion. The synthesized full body motion may then be applied to the user's avatar. As a result of the synthesis process, a user's raw input motions may be transformed in real-time into elegant and/or athletic full body animations that are performed in the style one or more subjects.

Accordingly, the present disclosure provides a plurality of technical benefits including but not limited to: adaptively decoupling user input motions from a virtual avatar rendering, stylizing user input to match motions performed by experts or other users, generating full body motion from a subset of user inputs, integrating motion scaling as part of motion stylization, maintaining hand-eye coordination, embodiment, and proprioception when rendering virtual avatar motions, synthesizing stylized motion trajectories using a dataset of motion data, evaluating a set of candidate motions using feature data of user input and stored motion data, translating body motions into a user-centric coordinate system/space, evaluating multiple body segments individually in multiple data frames, ranking candidate motions/positions using one or more algorithms, scaling user input to enable a low motion footprint, stylizing motion for users in space-constrained environments, users having physical limitations, and enabling users to reduce fatigue and risk of injury while using VR, AR, and/or MR systems, among other examples.

FIG. 1 illustrates an overview of an example system for providing real-time motion styling in VR, AR, and/or MR environments as described herein. Example system 100 presented is a combination of interdependent components that interact to form an integrated whole for rendering 2D and/or 3D content in a virtual environment or an environment comprising virtual content. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, system 100 may provide an environment for software components to run, obey constraints set for operating, and utilize resources or facilities of system 100, where components may be software (e.g., application, program, module, etc.) running on one or more processing devices. For instance, software (e.g., applications, operational instructions, modules, etc.) may be run on a processing device such as a personal computer (PC), a mobile device (e.g., smartphone/phone, tablet, laptop, personal digital assistant (PDA), etc.) and/or any other electronic computing devices. As an example of a processing device operating environment, refer to the example operating environments depicted in FIGS. 4-7. In other examples, the components of systems disclosed herein may be distributed across multiple devices. For instance, input may be entered on a client device and information may be processed or accessed from other devices in a network, such as one or more server devices.

As one example, system 100 comprises computing devices 102 and 104, virtual environment service 106, distributed network 108, and motion capture data store 110. One of skill in the art will appreciate that the scale of systems such as system 100 may vary and may include more or fewer components than those described in FIG. 1. In aspects, computing devices 102 and 104 may be any of a variety of computing devices, including, but not limited to, the processing devices described above. Computing devices 102 and 104 may be configured to use one or more input devices for interacting with virtual environment service 106, such as a head-mounted display device or an alternate virtual environment visualization system, zero, one or more controller devices (e.g., joysticks, control wands, force balls, tracking balls, etc.), a remote sensing of the user motion including microphones, cameras, depth cameras, radar, magnetic or acoustic sensing, data gloves, a body suit, a treadmill or motion platform, a keyboard, a microphone, one or more haptic devices, or the like. Such input devices may comprise one or more sensor components, such as accelerometers, magnetometers, gyroscopes, etc. In examples, the input devices may be used to interact with and/or manipulate content presented using virtual environment service 106.

Virtual environment service 106 may be configured to provide a virtual environment and/or to apply virtual content to a physical or virtual environment. For example, virtual environment service 106 may provide a VR environment, or may provide the virtual content and interactions displayed in AR and MR environments. In aspects, virtual environment service 106 may be, for example, provided as part of an interactive productivity or gaming platform. It will be appreciated that while virtual environment service 106 is illustrated as separate from computing devices 102 and 104, virtual environment service 106 (or one or more components or instances thereof) may be provided separately or collectively by computing devices 102 and/or 104. As a particular example, computing devices 102 and 104 may each provide a separate instance of virtual environment service 106. In such an example, the instance of virtual environment service 106 may be accessed locally on computing device 102 using a stored executable file; whereas, computing device 104 may access the instance of virtual environment service 106 over a network, such as distributed network 108. In aspects, virtual environment service 106 may provide virtual content to one or more users of computing devices 102 and 104. The virtual content may include interactive and non-interactive elements and content. As one example, virtual environment service 106 may provide an interactive virtual avatar of a user. A user may interact with the virtual avatar using the input devices described above. When user movement is detected from one or more of the input devices, virtual environment service 106 may search motion capture data store 110 for motion data matching the user movement. Virtual environment service 106 may apply the matched motion data to the virtual avatar, thereby causing the virtual avatar to execute the motion data.

Motion capture data store 110 may be configured to store motion capture data and additional data associated with motion data, such as audio data, pressure data, torque data, a depth cloud of points, facial expression data, etc. The motion capture data may comprise motion data associated with various actions, activities, and/or movements. The motion capture data may comprise full body motion data and/or partial body motion data (e.g., only head and hand motion data). In some examples, the motion data may be organized into one or more categories, such as human interaction data, locomotion data, sporting activity data, non-human motion data, etc. The motion data may be collected from multiple subjects using one or more motion capture systems/devices, such as inertial motion capture sensors, mechanical motion capture sensors, magnetic motion capture systems sensors, optical motion capture sensors, RGBD cameras, radar, recovery from existing videos, animation, physical simulation, non-human actors, etc. The subjects may represent or be classified into various subject categories, such as experts or professionals, notable or famous subjects, moderate or low experience subjects, etc. In aspects, the motion data may be associated with a set of feature data. The feature data may comprise information related to the various poses performed during a particular motion. Such information may include, for example, velocity, acceleration, and/or position data for one or more segments of a user's body during the course of the motion. Such information may additionally include depth point cloud data, audio data, pressure data, torque data, brain wave recordings, etc. For instance, a particular motion may be segmented into 360 individual data/pose frames over three seconds.

Figure 2:
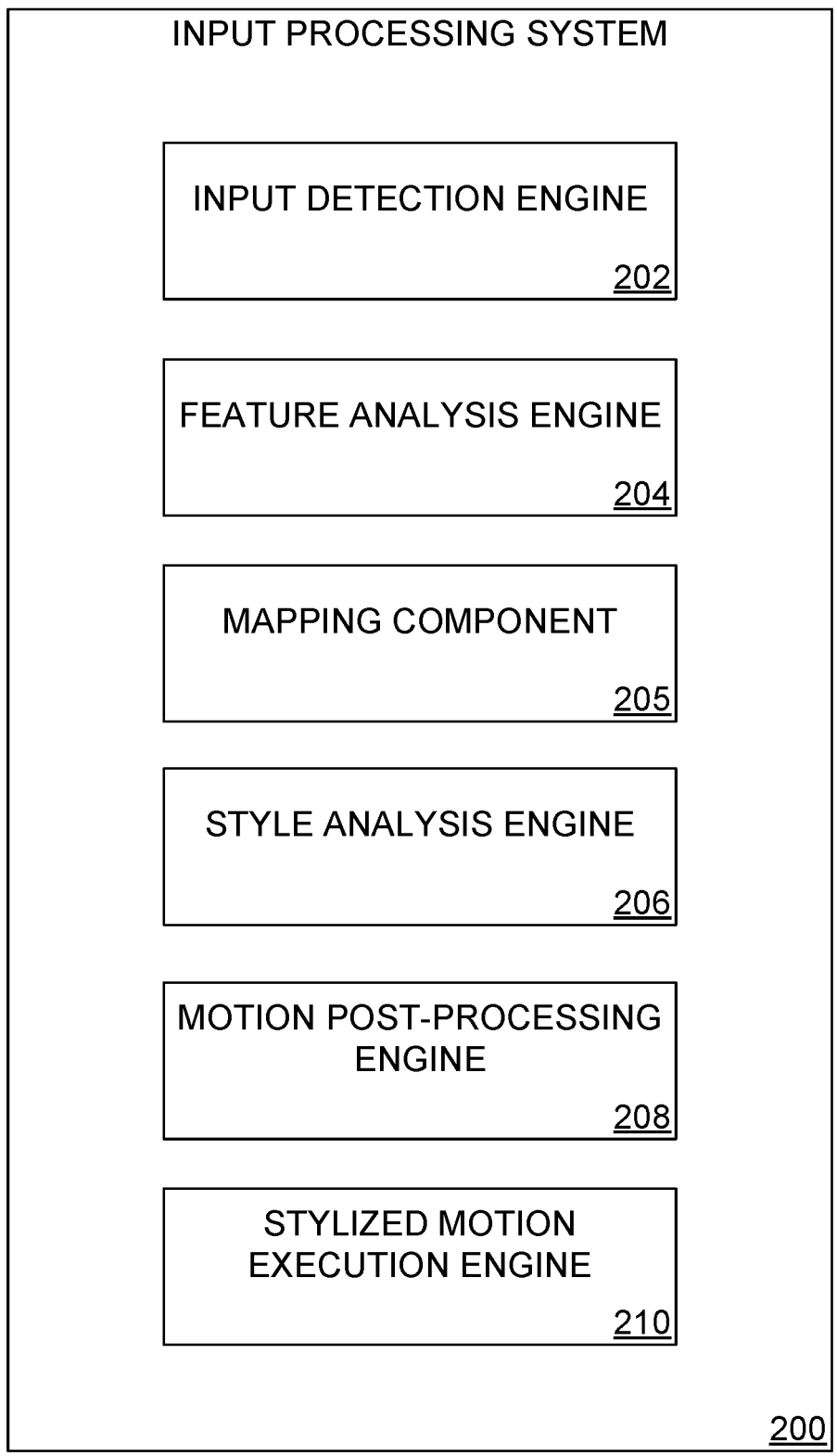
FIG. 2 illustrates an example input processing unit for providing real-time motion styling in VR, AR, and/or MR environments as described herein.

FIG. 2 illustrates an overview of an example input processing system 200 for providing real-time motion styling in VR, AR, and/or MR environments as described herein. The motion styling techniques implemented by input processing system 200 may comprise the techniques and data described in the system of FIG. 1. In some examples, one or more components (or the functionality thereof) of input processing system 200 may be distributed across multiple devices. In other examples, a single device (comprising at least a processor and/or memory) may comprise the components of input processing system 200.

In aspects, input processing system 200 may generate or provide access to one or more virtual (e.g., VR, AR, or MR) environments. The virtual environments may be viewable using a HMD or similar display technology (not pictured) and may comprise virtual content and/or physical (e.g., real world) content. The virtual content may be manipulated (or otherwise interacted with) using one or more input devices (not pictured). In FIG. 2, input processing system 200 comprises input detection engine 202, feature analysis engine 204, mapping component 205, style analysis engine 206, motion scaling engine 208, and stylized motion execution engine 210. One of skill in the art will appreciate that the scale of system 200 may vary and may include more or fewer components than those described in FIG. 2.

Input detection engine 202 may be configured to detect user input. The user input may be provided by zero, one, or more input devices being operated by one or more users, and possible external sensings of the user(s). In examples, input detection engine 202 may comprise one or more sensor components, such as accelerometers, magnetometers, gyroscopes, and the like. Alternately, or additionally, such sensor components may be implemented into input devices being operated by a user. In either case, input detection engine 202 may detect or receive input data corresponding to user interaction with a virtual environment or virtual (or physical) content thereof. The input data may include motion data, audio data, text data, eye tracking data, object or menu interaction data, etc. In many aspects, the input data may be collected as, and/or segmented into, one or more data files or data sessions. Input detection engine 202 may store the input data in one or more data storage locations and/or provide the input data to one or more components of input processing system 200, such as feature analysis engine 204.

Feature analysis engine 204 may be configured to create a set of feature data from received input data. In aspects, feature analysis engine 204 may have receive (or otherwise have access to) the received input data. Upon accessing the input data, feature analysis engine 204 may perform one or more processing steps on the input data. As one example, feature analysis engine 204 may segment the input data into a set of data frames. Each data frame may represent, for example, an 'N' millisecond chunk of the input data. For each set of frames, position data may be identified for each input device that has received/detected input. For instance, position data for a user's head and hands may be identified. In some aspects, the position data may be translated into head-centered coordinate system. That is, the position data may be normalized to a user head space. After translating/normalizing the position data, feature data may be generated for each set of frames. The feature data may comprise acceleration, velocity, and position information for each input device. The feature data may be used to create one or more feature vectors. A feature vector, as used herein, may refer to an n-dimensional vector of numerical features that represent one or more data points or objects. In at least one aspect, the feature analysis engine 204 may generate features for more than one user. The features generated for multiple users may be used by feature analysis engine 204 to fit a motion based on input from multiple users.

In aspects, feature analysis engine 204 may further be configured to create a set of comparison feature data from stored motion data. In aspects, feature analysis engine 204 may have access to a data repository comprising motion capture data for various actions, activities, events, and/or movements. The motion capture data may be organized and/or stored in data sessions. Each data session may represent a particular action, activity, or event performed by a particular subject (or subjects). For each data session, feature analysis engine 204 may translate the motion in the data session to a head-centered coordinate system, as previously described or to an alternate projection of the data. The translation may be invariant to general rotation and translation, or variant to rotation and position (such as global positions). The data session may then be decimated to match the frame rate of one or more of the input devices. As a specific example, a data session may be decimated to match the 90 Hz frame rate of a VR system's controllers. Each data session may then be divided into chunks of time comprising position data for each input device over time. For instance, each data session may be divided into 100 millisecond chunks using a sliding window with a 50 millisecond overlap. A representative pose window (e.g., a sequence of poses) for each data session may be selected from the various pose windows in that data session. The representative pose window may generally represent the particular action, activity, or event performed in the data session.

In some aspects, in order for subsequent matching computations to be invariant to rotation about the Y-axis, each pose window in the motion capture data may be transformed to the coordinate space of the representative pose window along the Y-axis. The transformation comprises finding the rotation between two 3D temporal point clouds wherein correspondence is known. In at least one example, the following equation may be used:

$$\theta = \arctan \frac{\sum_i^n w_i(x_{q_i} z_{s_i} - x_{s_i} z_{q_i}) - \frac{1}{\sum_i^n} \left( \sum_i^n w_i x_{q_i} \sum_i^n w_i z_{s_i} - \sum_i^n w_i x_{s_i} \sum_i^n w_i z_{q_i} \right)}{\sum_i^n w_i(x_{q_i} x_{s_i} + z_{s_i} z_{q_i}) - \frac{1}{\sum_i^n} \left( \sum_i^n w_i x_{q_i} \sum_i^n w_i x_{s_i} + \sum_i^n w_i z_{s_i} \sum_i^n w_i z_{q_i} \right)}$$

In the above equation, $w_i$ denotes the weight assigned to each point in the temporal window, n represents the number of frames in a data session, q denotes the pose window to be rotated, s denotes the representative pose window, and x and z respectively represent the x and z coordinates of the subject's left and right hands. In this equation, the weights are used under the assumption that position vectors at the start of the pose window should have more weight than position vectors at the end of the pose window. After rotation-normalizing each data session, feature data (e.g., comparison feature data) may be created for the data session. A feature vector may be created from the feature data and stored with or for the data session.

Mapping component 205 may be configured to map feature data to a sensed motion. In aspects, mapping component 205 may map the feature data to one or more motions. For example, the mapping component 205 may map the feature data to head and hand movements corresponding to a tennis serve motion. The mapping may include, for example, non-uniform scaling of user motion to a full body motion, correcting for missing or different limb motions, mapping from a human motion to a non-human motion, mapping from a non-human motion to a human motion, and/or other transformations as needed by the VR system/application. As one specific example, mapping component 205 may map feature data corresponding to a walking motion to the walking motion of an avatar represented as an eight-legged spider.

Style analysis engine 206 may be configured to compare received input data to stored motion data. In aspects, style analysis engine 206 may access the feature vector for the input data (the "input feature vector"). After accessing the input feature vector, style analysis engine 206 may iterate through the data sessions in the stored motion data. In some examples, upon accessing the stored motion data, style analysis engine 206 may create (or cause feature analysis engine 206 to create) the set of comparison feature data for the stored motion data, as described above. Once the input feature vector and the feature vectors of the data sessions (the "comparison feature vectors") are in the same coordinate space (e.g., the head-centered coordinate system), comparisons are performed. The comparisons may comprise calculating a matching distance between the input feature vector and each comparison feature vector using, for example, a k-nearest neighbor algorithm. Based on the comparisons, a top k values within a distance D may be identified. In examples, this comparison may be performed separately for different limbs. For instance, the top $k_l$ candidates matches for a user's left hand may be identified and the top $k_r$ candidates matches for a user's right hand may be identified.

In aspects, the various candidate matches for each input device may be used to synthesize a final stylized motion. The synthesized style motion may be limited to those portions of the avatar for which motion has been detected using one or more input devices. For instance, if user motion is detected by only an HMD and two hand controllers, the corresponding stylized motion may be generated for only the avatar's head and hands. Alternately, the synthesized style motion may incorporate extrapolated data for one or more portions of the avatar for which motion has not been detected. For instance, if user motion is detected by only an HMD and two hand controllers, the corresponding stylized motion may incorporate a full body (e.g., torso, leg joints, feet, etc.) motion that matches the detected motion. As a result, the final stylized motion may maintain the characteristics of the user's input motion while imposing a stylized motion on the entire body of the avatar.

In aspects, the final stylized motion may be synthesized using various techniques. As one example, the distribution of features in the stored motion data may be modeled as a mixture of Gaussians. A given candidate match pose may be modeled as a weighted linear combination of means used in the mixture model, and two matches may be combined to maximize the likelihood of the resulting interpolated match. As another example, the synthesis may be accomplished using the distance metric (D) calculated during the comparison described above. For instance, given the distance of the k matches represented as $d_k$, a weight inversely proportional to $d_k$ may be constructed. For the left and right hands, the following equation may be used:

$$W_l = \frac{d_{max} - d_{k_l}}{d_{max}} \text{ and } W_r = \frac{d_{max} - d_{k_r}}{d_{max}}$$

In the above equation, $W_l$ denotes the weight for the left hand, $W_r$ denotes the weight for the right hands, denotes the maximum distance threshold of a valid match, and W is between 0 and 1. Based on the above equation, the output pose O and the per-joint probability J may be computed using the following equations:

$$O = \frac{W_l K_l + W_r K_r}{W_l + W_r} \text{ and } J = \frac{W_l^2 + W_r^2}{W_l + W_r}$$

To maintain spatial consistency, output pose O may be fitted with a human skeletal kinematic model based on joint probability. To maintain temporal consistency, the following exponential weighted moving average may be used:

$$O_t = JO_t + (1-J)O_{t-1}$$

The resulting output pose $O_t$ may be converted back into the user input space by rotating Or back and adding the head translation vector to $O_t$.

Motion post-processing engine 208 may be configured to transform the output motion for the input data. Example methods of transformation include motion scaling (e.g., one-to-one scaling, position-based scaling, trajectory-based scaling, etc.), applying motion filters (e.g., a cartoon animation filter, a motion blur filter, a motion distortion filter, etc.), applying motion smoothing techniques (e.g., using a smoothing convolution kernel, a Gaussian smoothing processor, etc.), or the like. Such methods of transformation may enable a user to keep a low motion footprint when performing motions in space-constrained environment, or enable a user to avoid fatigue when performing large or extensive motions. In aspects, motion post-processing engine 208 may map the position information of the input feature vector and/or input data to one or more virtual objects in a virtual environment. The mapping may include one or more motion transformation techniques. As one example, motion post-processing engine 208 may implement a one-to-one mapping, in which a user's detected motion is strongly coupled to the rendered motion of the user's avatar. That is, the motion of the user is directly reflected in the virtual environment as performed. As another example, motion post-processing engine 208 may implement position-based scaling, in which a factor may be used to lengthen or contract the distance of a virtual object from a particular point. As a particular example, a constant factor may be used to increase or decrease the reach of an avatar's hand with respect to the avatar's shoulder position. This may be mathematically represented as:

$$P_{virtual_{hand}} = P_{real_{shoulder}} + s*(P_{real_{hand}} - P_{real_{shoulder}})$$

In the above equation, s is the scaling factor. As yet another example, motion post-processing engine 208 may implement trajectory-based scaling, in which a factor may be used to scale the velocity of a virtual object. As a particular example, rather than scaling the position of the avatar's hand, a constant factor is used to scale the velocity of the avatar's hand. This may be mathematically represented as:

$$P_{virtual\_hand_t} = P_{virtual\_hand_{t-1}} + s*(P_{real\_hand_t} - P_{real\_hand_{t-1}})$$

In the above equation, s is the scaling factor. As still yet another example, motion post-processing engine 208 may implement an adaptive scaling technique that uses different zones of scaling based on the distance of a objects to the user's body. For instance, motions near the user's body may be strongly coupled to preserve proprioception; whereas, when objects (such as hands) move away from the user's body, more scaling may be applied. In this approach, scaling may be disabled when virtual objects (such as virtual hands) are extended to the maximum limit of the avatar to prevent the appearance of unnaturally extending the virtual objects.

Stylized motion execution engine 210 may be configured to render stylized motion. In aspects, stylized motion execution engine 210 may apply the motion stylization determined by style analysis engine 206 and the motion transformation (e.g. scaling, applying filters, etc.) determined by motion post-processing 208 to a user's avatar or an alternate virtual object. Applying the motion stylization and scaling may cause the avatar or virtual object to execute one or more stylized motions. The motion stylization and scaling may be applied such that the user is able to maintain full agency over the avatar or virtual object throughout the user's movement cycle.

Having described various systems that may be employed by the aspects disclosed herein, this disclosure will now describe one or more methods that may be performed by various aspects of the disclosure. In aspects, method 300 may be executed by an execution environment or a system such as system 100 of FIG. 1 or system 200 of FIG. 2. However, method 300 is not limited to such examples. In other aspects, method 300 may be performed on an application or service providing a virtual environment. In at least one aspect, method 300 may be executed (e.g., computer-implemented operations) by one or more components of a distributed network, such as a web service/distributed network service (e.g. cloud service).

Figure 3:
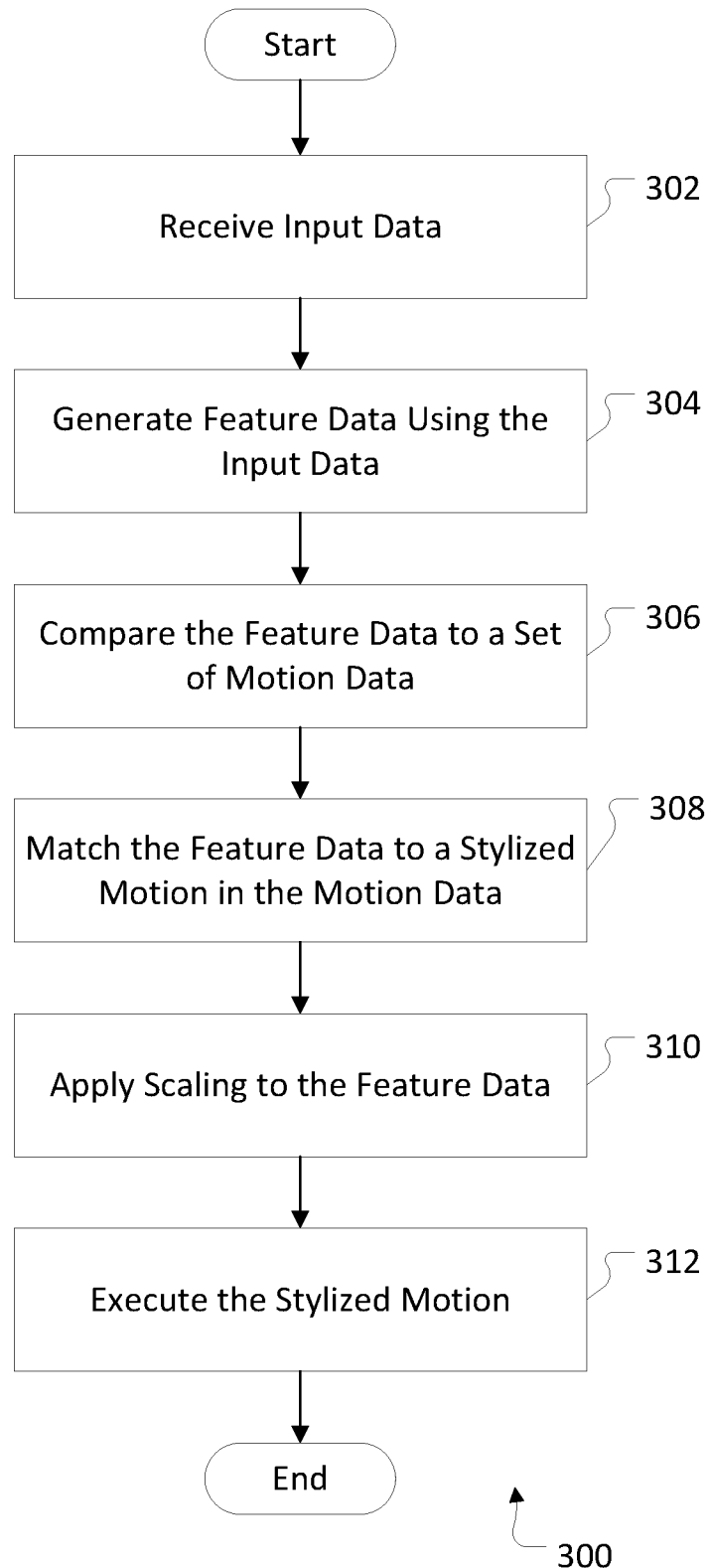
FIG. 3 illustrates an example method for providing real-time motion styling in VR, AR, and/or MR environments as described herein.

FIG. 3 illustrates an example method 300 for providing real-time motion styling in a VR environment as described herein. Although method 300 is described herein with respect to a VR environment, it will be appreciated that the techniques of method 300 may also be applied to other virtual or 3D environments, such as AR and MR environments. In aspects, a virtual application, service, or system, such as virtual environment service 106, may provide a virtual environment comprising various 2D and/or 3D objects. The virtual application/service/system (hereinafter, "virtual system") may be associated with a display device for viewing the virtual environment and one or more input devices for interacting with the virtual environment. The virtual system may utilize a rendering component, such as stylized motion execution engine 210. The rendering component may be used to render various virtual content and objects. In examples, at least one of the rendered objects may be a virtual avatar representing a user interacting with the virtual environment.

Example method 300 begins at operation 302, where input data corresponding to user interaction with the virtual system may be received. In aspects, one or more input devices comprising sensor components may be used to provide input data to a virtual system. The input devices (or the sensor components thereof) may detect the input data in response to various user inputs, such as motion data, audio data, textual data, eye tracking data, etc. As a specific example, a user of a VR application of a virtual system may use an HMD and two hand controllers to interact with the VR application. The HMD and the hand controllers may each comprise one or more sensor components (e.g., accelerometers, magnetometers, gyroscopes, etc.). While using the HMD and the hand controllers, the user may simulate an action, such as a tennis serve. The sensors of the HMD and the hand controllers may collect and/or record the motion data of the simulated action. The motion data may include, for instance, velocity, acceleration, and/or position information for the user's head and hands over the duration of the simulated action. In some aspects, the motion data may be collected and/or stored as one or more data frames in accordance with the technical capabilities of the virtual system. For instance, the input data may be stored in data frames in accordance with the 90 Hz frame rate of the virtual system hand controllers. The collected motion data may be provided to the VR application in real-time, or upon set intervals (e.g., every second). A data collection component of the VR application, such as input detection engine 202, may receive and/or store the input data.

At operation 304, feature data may be generated using the received input data. In aspects, the received input data may be provided to an input data analysis component of the VR application or virtual system, such as feature analysis engine 204. The input data analysis component may perform one or more processing steps on the input data. One processing step may comprise segmenting the input data into a set of data frames, each representing a time period in the input data. For instance, the input data may be segmented into 100 millisecond data frames. Alternately, the input data analysis component may simply identify such segments in the set of data frames. Another processing step may comprise identifying motion data in each of the data frames. For example, in each data frame, position data may identified for each input device being used to interact with the virtual system, regardless of whether an input device has detected input data. Alternately, position data may be identified for only those input devices that have detected input data. In some aspects, the identified position data for each data frame may be translated into a particular coordinate system. For example, the position data may be normalized to a particular head space or head position of the user or the user's HMD. Although specific reference has been made herein to normalization with respect to a user head space/position, alternate methods and points of normalization are contemplated. Yet another processing step may comprise generating feature data for the input data. For example, for each data frame, feature data may be generated for each input device represented in the data frame. The feature data may comprise acceleration, velocity, and/or position information for each input device. The feature data may be used to create one or more feature vectors representing the feature data of one or more data frames. In at least one example, a feature vector may be a concatenation of acceleration, velocity, and position, thereby encapsulating the spatio-temporal information of one or more data frames.

At operation 306, feature data may be compared to a set of motion data. In aspects, generated feature data may be provided to (or otherwise accessed by) a feature comparison component of the VR application or virtual system, such as style analysis engine 204. The feature comparison component may have access to a data repository of motion capture data and/or video data, such as the Carnegie Mellon University Motion Capture dataset. The data repository may comprise motion data corresponding to various actions or activities performed by one or more motion capture subjects. As a specific example, the data repository may comprise motion data files (or other data structures) corresponding to the activities of tennis, boxing, basketball, running, and swimming. The motion data for each activity may be grouped into sub-activities of the activity. For example, the tennis motion data files may divide into the categories, serving motion data files, forehand motion data files, backhand motion data files, volley motion data files, etc. For each activity (and/or sub-activity), motion data for multiple motion capture subjects may be stored. For example, the tennis motion data may comprise motion data for tennis professionals, such as Serena Williams, Roger Federer, Steffi Graff, and Jimmy Connors. As each motion capture subject may perform each activity (and/or sub-activity) using different or distinctive motions, the motion data for a particular motion capture subject may represent the motion "style" of the subject. In some aspects, the motion data of the data repository may comprise or be stored with corresponding feature data. For instance, each motion data file may comprise a corresponding feature vector.

In aspects, the feature data for the input data ("input feature data") may be matched against the motion capture data indexed by these features ("comparison feature data"). The evaluation may comprise comparing one or more feature vectors associated with the input feature data to one or more feature vectors associated with the comparison feature data. The comparison may include iterating through each motion data file or data structure. Alternately, the comparison may include using one or more search utilities to search the data repository. As a specific example, a feature vector associated with an input feature data for a simulated tennis serve may be provided to a motion recognition model or utility. The motion recognition model/utility may analyze the feature vector to determine a category of activity (e.g., tennis) associated with the feature vector. Based on the determination, the motion recognition model/utility may identify or retrieve a set of motion data classified as (or relating to) tennis. In some aspects, the comparison may further include using one or more classification algorithms or techniques, such as k-nearest neighbor, logistic regression, Naive Bayes classifier, support vector machines, random forests, neural networks, etc. The classification algorithms/techniques may be used to determine a set of candidate motions approximately matching the input data. For instance, a k-nearest neighbor algorithm may be used to determine the top k candidates matching the values of a feature vector associated with input feature data. The determination may include an analysis of motion data received from multiple input device. For instance, the top $k_l$ candidate matching a user's left hand may be identified and the top $k_r$ candidate matching the user's right hand may be identified.

At operation 308, a motion may be synthesized from a set of matching candidates. In aspects, a feature motion synthesis component of the VR application or virtual system, such as style analysis engine 204, may determine one or more top/best candidates from a list of motion candidates. In a specific example, the determination may include using k-nearest neighbor algorithm to identify the top value(s) with a Euclidian distance D of one or more features in the feature data. In such as example, if no values are determined to be within distance D, no candidates may be selected from the list of motion candidates. The determined top candidate motion may be used to synthesize a style motion or select a motion style from the set of motion data. Synthesizing the style motion may include the use of one or more synthesis techniques. As one example, the distribution of features in the stored motion data may be modeled as a mixture of Gaussians. A given candidate match pose may be modeled as a weighted linear combination of means used in the mixture model, and two matches may be combined to maximize the likelihood of the resulting interpolated match. As another example, the distance metric (D) calculated during the comparison may be used to construct an inversely proportional weight that is applied to the motion data of the various input devices. In this example, the out pose may be fitted with a human skeletal kinematic model based on joint probability. In some aspects, synthesizing a style motion may further include interpolating a full (or partial) body motion/poses from the feature data. For instance, continuing from the above example, a user may simulate a tennis serve while using an HMD and hand controllers of a VR system. Based on the input data from the HMD and hand controllers, a motion style may be selected from the repository of motion data. The motion data may include head and hand motion data for a tennis serve as well as torso and lower body motion data. Accordingly, a full body style motion for a tennis serve may be selected for the input data.

At operation 310, a post-processing transformation (for example, scaling) may be applied to the generated avatar motion. In aspects, the generated motion (interpolated from closest motions from the motions data set) may undergo a transformation to VR space. Examples of transformations may include one or more motion scaling techniques, such as one-to-one mapping, position-based scaling, trajectory-based scaling, zone-based scaling, or some combination thereof. In examples, scaling may enable a user to keep a low motion footprint when performing motions in space-constrained environment, or enable a user to avoid fatigue when performing large or extensive motions. For instance, continuing with the above example, a user of a VR application may simulate a tennis serve. Due to space constraints of the user's physical environment (such as a low ceiling), the user may not be able to fully extend her hand upward during the simulated tennis serve. Upon receiving the input data for the simulated tennis serve, the motion scaling component may apply one or more adaptive motion scaling techniques to the received input data. Based on the scaling technique, the positional information in the input data may be scaled such that the user' physical constraint is not applied to the user's avatar. That is, the hand of the user's avatar may fully extend upward as the avatar simulates the tennis serve.

At operation 312, the synthesized style motion may be assigned to a virtual avatar by the virtual reality system. In aspects, the synthesized motion may be applied to one or more objects in the VR application (component 210). For instance, a synthesized stylized motion may be applied to a user's avatar. As a result, the avatar may move in a new stylized motion in a manner which fully expresses the avatar's motions. That is, in a manner that does not indicate a physical limitation of the user or the user's physical environment.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, described herein.

Figure 4:
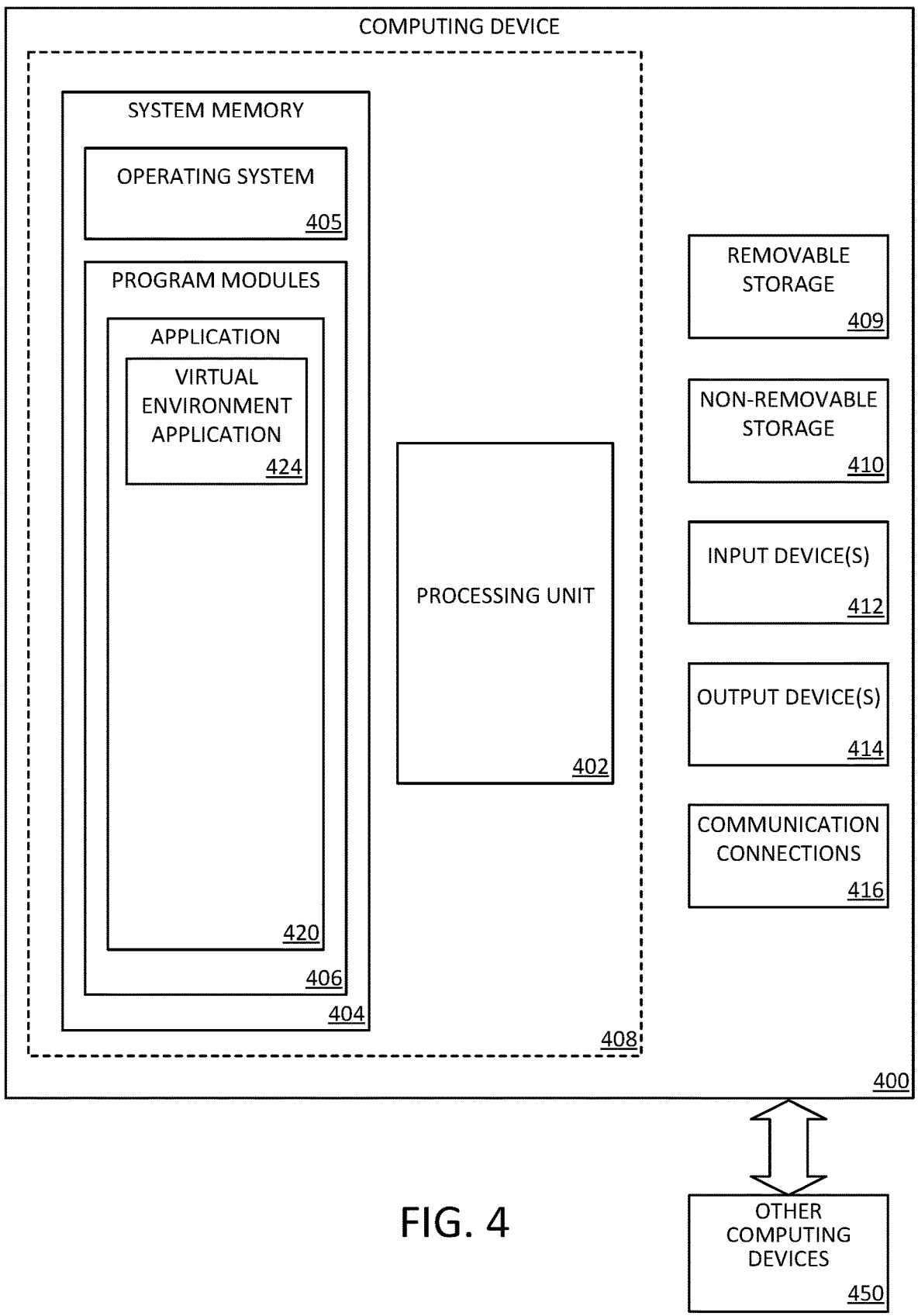
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices described above, including the computing devices 102 and 104 and the virtual environment service 106. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for running software application 420, such as one or more components supported by the systems described herein. As examples, system memory 404 may virtual environment application 424 and text web part 426. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
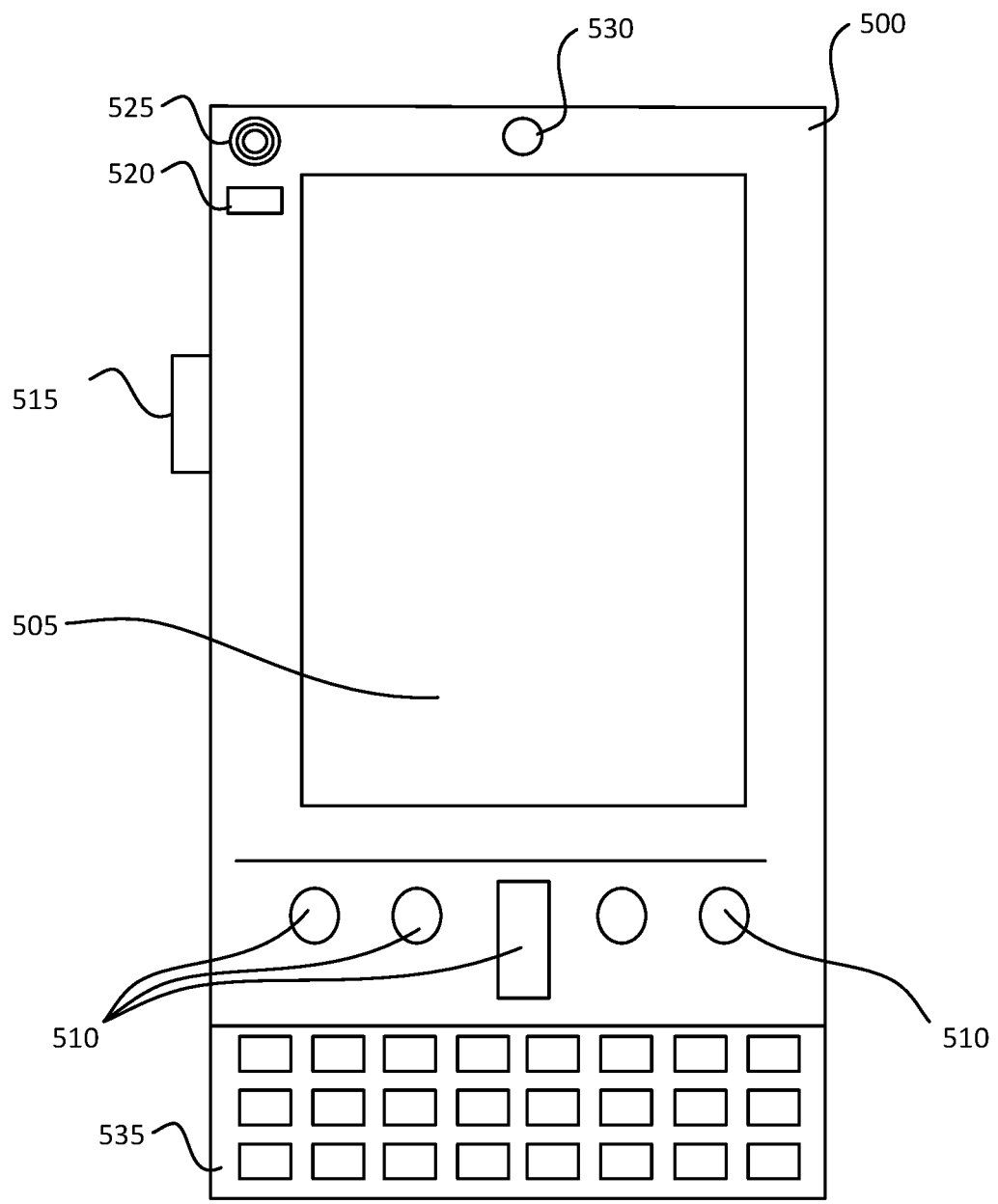
FIGS. 5A and 5B are simplified block diagrams of a mobile computing device with which aspects of the present disclosure may be practiced.
Figure 5B:
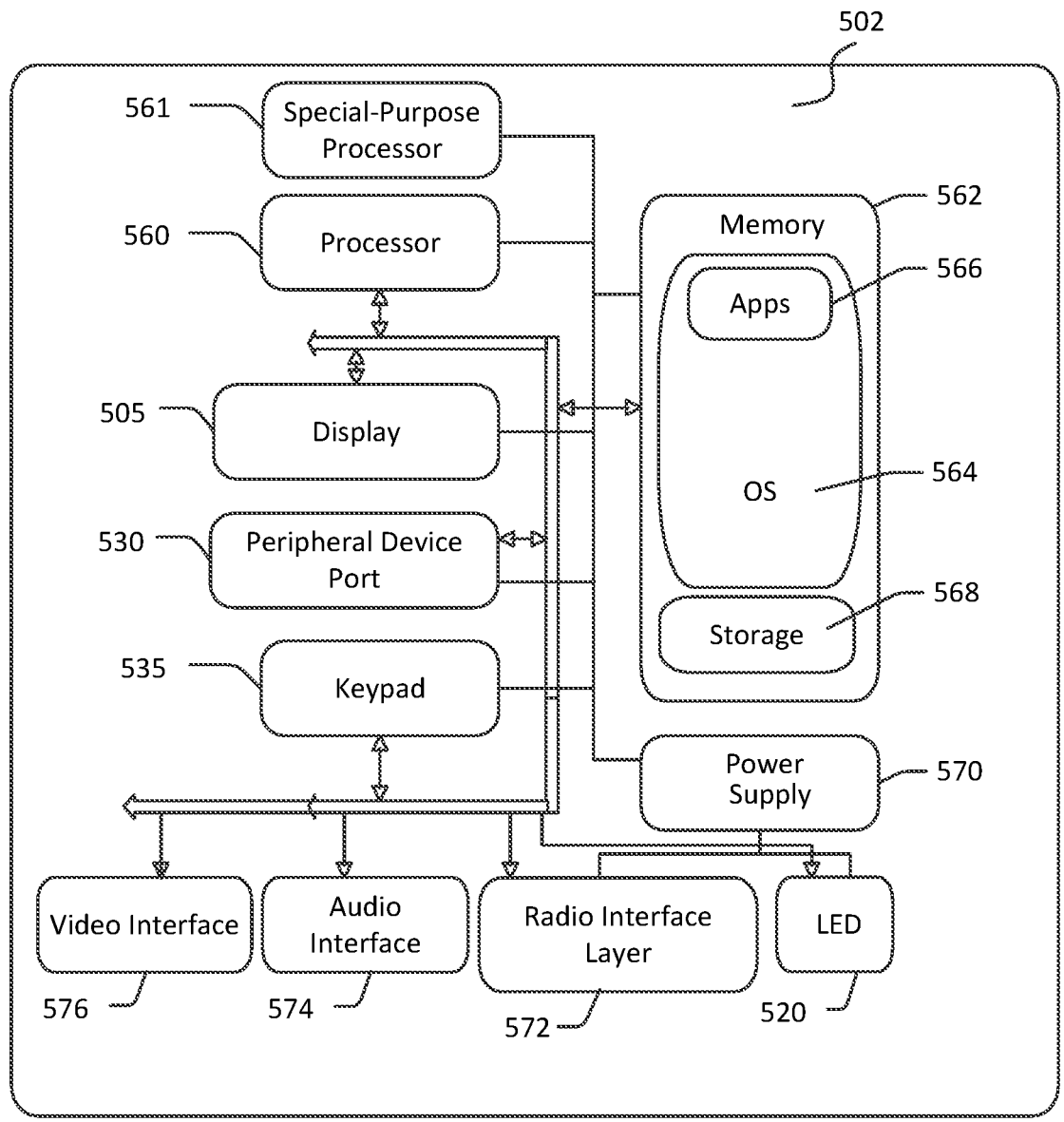

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display).

If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments.

In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display.

In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., search engine, extractor module, relevancy ranking module, answer scoring module, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

Figure 6:
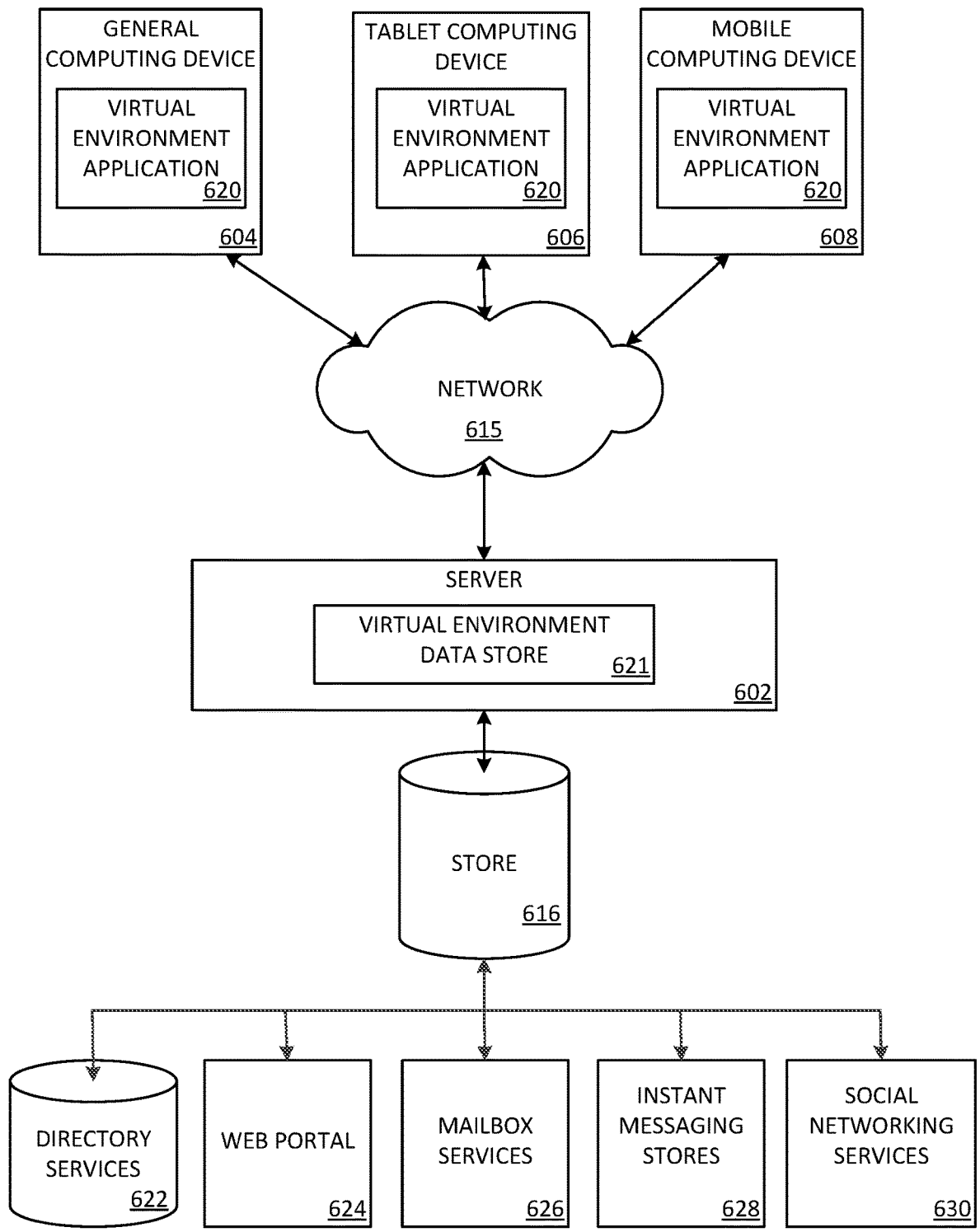
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630.

A virtual environment application 620 may be employed by a client that communicates with server device 602, and/or the virtual environment data store 621 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
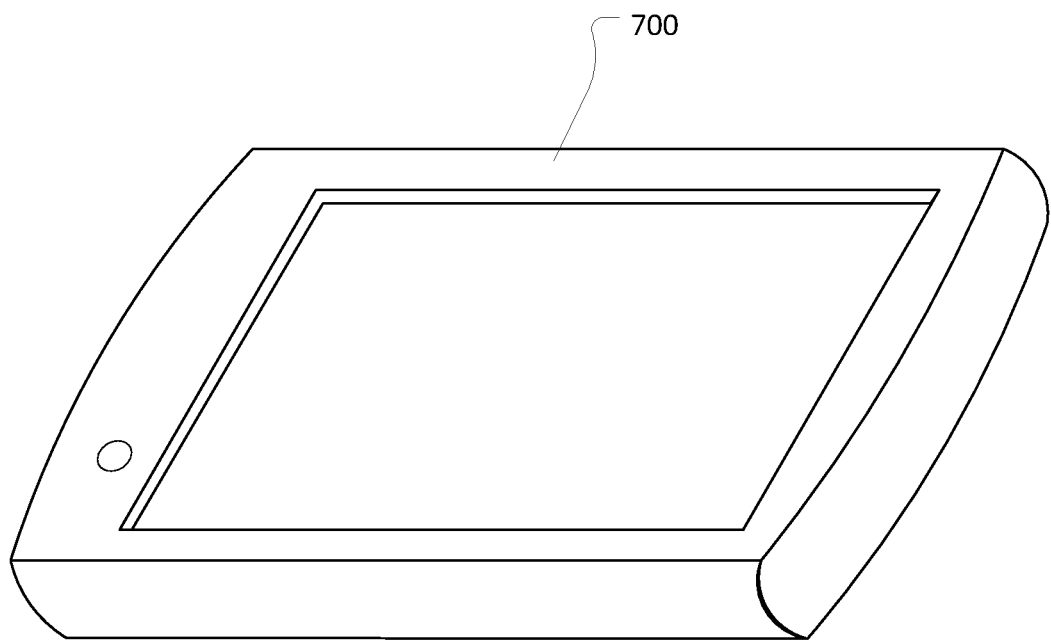
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   one or more processors; and
   memory coupled to at least one of the one or more processors, the memory comprising computer executable instructions that, when executed by the at least one processor, performs a method comprising:
   receiving real time input data corresponding to user movement in a virtual reality system;
   extracting feature data from the input data;
   comparing the feature data to stored motion data, wherein the comparing comprises identifying a set of motions in the stored motion data, wherein the set of motions comprise at least a first motion corresponding to a first body part and a second motion corresponding to a second body part, the second body part being different from the first;
   blending the set of motions to generate a stylized motion;
   applying a transformation to the stylized motion, wherein the transformation maps the stylized motion to a virtual reality space; and
   manipulating a user avatar according to the motion.

2. The system of claim 1, wherein the virtual reality system is accessed using a head-mounted display device.

3. The system of claim 1, wherein the input data is at least one of motion data, audio data, textual data, eye tracking data, a cloud of 3D points, depth data, or biological signals.

4. The system of claim 1, wherein the input data is collected from two or more input devices each comprising one or more sensor components.

5. The system of claim 4, wherein the feature data comprises at least one of acceleration information, velocity information, or position information of the one or more input devices.

6. The system of claim 1, wherein generating the feature data comprises translating the input data into a head-normalized coordinate system.

7. The system of claim 1, wherein the stored motion data comprises actions performed by a first motion capture subject and a second motion capture subject, the first motion capture subject performing the actions in a first style and the second motion capture subject performing the actions in a second style.

8. The system of claim 1, wherein comparing the feature data to the stored motion data comprises comparing a first feature vector associated with the feature data to one or more feature vectors associated with the stored motion data.

9. The system of claim 1, wherein comparing the feature data to the stored motion data comprises using one or more matching algorithms to identify one or more candidate matches for the feature data.

10. The system of claim 9, wherein the one or more matching algorithms comprise at least one of k-nearest neighbor, logistic regression, Naive Bayes classifier, support vector machines, random forests, or neural networks.

11. The system of claim 10, wherein matching the feature data to the stylized motion comprises synthesizing a stylized motion from the one or more candidate matches.

12. The system of claim 11, wherein synthesizing the stylized motion comprises constructing a weight that is inversely proportionate to the Euclidian distance between a first feature vector of the feature data and a second feature vector of the stored motion data.

13. The system of claim 1, wherein applying the transformation comprises applying at least one of: motion scaling, a motion filter, or motion smoothing.

14. The system of claim 13, wherein the motion scaling comprises using at least one of: one-to-one mapping, position-based scaling, trajectory-based scaling, or zone-based scaling.

15. The system of claim 1, wherein the stylized motion is applied to a virtual avatar of a user such that the stylized motion approximates the user interaction.

16. A method comprising:
   receiving, by a virtual environment system, user motion data corresponding to an activity performed by a user, wherein the input data is detected using one or more input devices associated with the virtual environment system;
   generating feature data using the input data;
   comparing the feature data to stored motion data, wherein the comparing comprises identifying a set of motions in the stored motion data, wherein the set of motions comprise at least a first motion corresponding to a first body part and a second motion corresponding to a second body part, the second body part being different from the first;
   blending the set of motions to generate a stylized motion;
   applying a transformation to the stylized motion, wherein the transformation maps the stylized motion to a virtual reality space; and
   manipulating, in the virtual environment system, an avatar of the user according to the transformed stylized motion.

17. The method of claim 16, wherein generating feature data comprises creating a feature vector representing the feature data, the feature vector comprising at least one of acceleration information, velocity information, or position information associated with the input data.

18. The method of claim 16, wherein comparing the feature data to the motion capture data comprises:
   categorizing the feature data as an activity type; and
   searching the stored motion data for the activity type.

19. The method of claim 16, wherein the stored motion data comprises stylized motion data for at least one of: experts of the activity, professionals of the activity, or famous entities.

20. A virtual environment system comprising:
one or more processors; and
memory coupled to at least one of the one or more processors, the memory comprising computer executable instructions that, when executed by the at least one processor, performs a method comprising:
receiving user motion data from a user performing an activity, wherein the user motion data is detected using one or more input devices associated with the virtual environment system;
generating feature data using the user motion data, wherein the feature data comprises at least one of acceleration information, velocity information, or position information associated with the activity;
comparing the feature data to stored motion data, wherein the comparing comprises identifying a set of motions in the stored motion data, wherein the set of motions comprise at least a first motion corresponding to a first body part and a second motion corresponding to a second body part, the second body part being different from the first;
blending the set of motions to generate a stylized motion;
applying a transformation to the stylized motion, wherein the transformation maps the stylized motion to a virtual space of the virtual environment system; and
executing the transformed stylized motion in the virtual space.

\* \* \* \* \*